US006208878B1

(12) United States Patent
Hattori et al.

(10) Patent No.: US 6,208,878 B1
(45) Date of Patent: Mar. 27, 2001

(54) RADIO COMMUNICATION APPARATUS

(75) Inventors: Kiyoshi Hattori; Munehisa Tomioka, both of Hino (JP)

(73) Assignee: Kabushiki Kaisha Toshiba, Kanagawa-ken (JP)

( * ) Notice: Subject to any disclaimer, the term of this patent is extended or adjusted under 35 U.S.C. 154(b) by 0 days.

(21) Appl. No.: 09/120,656

(22) Filed: Jul. 22, 1998

(30) Foreign Application Priority Data

Jul. 24, 1997 (JP) .................................................. 9-198144

(51) Int. Cl.[7] ...................................................... H04B 1/38
(52) U.S. Cl. ........................................... 455/566; 455/38.4
(58) Field of Search ............................ 395/701; 345/112, 345/467, 56 G, 123, 124; 707/500, 517, 518, 521, 531; 340/825.44; 455/38.4, 566

(56) References Cited

U.S. PATENT DOCUMENTS 3,976,995 * 8/1976 Sebestyen ....................... 340/825.44
5,465,401 * 11/1995 Thompson ........................... 455/558
6,023,231 * 2/2000 Tsunoda .......................... 340/825.44

FOREIGN PATENT DOCUMENTS 0 585 118 A1 2/1994 (EP) .
0 748 134 A2 11/1996 (EP) .
1 515 309 6/1978 (GB) .
04289915 * 10/1992 (JP) .

OTHER PUBLICATIONS

European Search Report (for Appln No. EP 98 30 5934).

* cited by examiner

*Primary Examiner*—Reinhard J. Eisenzopf
*Assistant Examiner*—N. Mehrpour
(74) *Attorney, Agent, or Firm*—Limbach & Limbach, LLP

(57) ABSTRACT

A radio communication apparatus is disclosed, that comprises a receiving portion for receiving a radio signal transmitted from a base station, the radio signal including character codes, a display portion for displaying a character string corresponding to character codes received by the receiving portion on a plurality of lines, a detecting portion for detecting a particular character from the character string displayed on the display portion, and a display controlling portion for displaying a word just after the particular character at the beginning of the next line. According to the present radio communication apparatus , a word in a message composed of a character string is prevented from being displayed in a plurality of lines. Thus, a character string is displayed on the screen of the display portion in such a manner that the user can easily read the character string.

7 Claims, 9 Drawing Sheets

FIG. 4

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| CHARACTOR | C | A | L | L | _ | O | F | F | I | C | E | _ | T | O | S | H | I | B | A | NULL |

FIG. 9
| | 1 | 2 | 3 | 4 | 5 | 6 | 7 | 8 | 9 | 10 | 11 | 12 | 13 |
|---|---|---|---|---|---|---|---|---|---|---|---|---|---|
| CHAR | T | H | I | S | _ | I | S | _ | A | _ | P | E | N |
FIG. 10
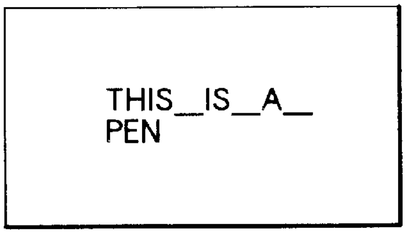
FIG. 11
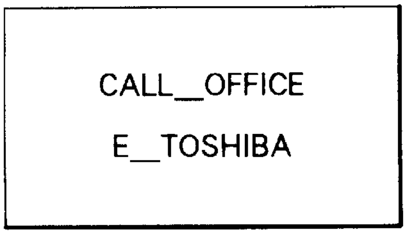

RADIO COMMUNICATION APPARATUS

BACKGROUND OF THE INVENTION

1. Field of the Invention

The present invention relates to a radio communication apparatus for use with a mobile station of a radio communication system.

2. Description of the Related Art

In recent years, a digital mobile communication system has provided a character data service for allowing communication terminals to exchange character data. Each communication terminal has a key input portion and a display portion (such as a liquid crystal display). With the input portion of the communication terminal on the transmission side, the user can input a desired message as a character string code. The message being input is displayed on the display portion. In the communication terminal on the reception side, the received character string code is converted into character data and displayed on the display portion.

When a message described in English is communicated, a space is placed between each word. A message is communicated as a character string code including space codes between each communication terminal. Thus, as shown in FIG. 11, a character string that composes one word may be displayed on two lines. To prevent a word from being divided, the transmission side may manually add a required number of space codes to a character string code. However, such a method results in increasing work. In addition, the number of characters displayed on the display portion may vary in each terminal unit. Moreover, when a communication is broken due to a deterioration of a radio communication environment such as fading, to minimize the length of communication data, it is undesirable to use space codes to fill in a line.

As another method, control codes may be placed in a character string code. However, in this method, since the communication data becomes long, this method is not proper.

Thus, since it is preferable to minimize the length of the communication data transmitted between communication terminals, it is preferable that a communication message is composed of only character codes. However, in this case, since a character string that composes a word as in English is often displayed on two lines, the user cannot easily see the resultant message.

SUMMARY OF THE INVENTION

An object of the present invention is to provide a radio communication apparatus that prevents each word of a message received as a character string from being displayed on a plurality of lines so that the user can easily see the message.

Another object of the present invention is to provide a radio communication apparatus that allows the user to easily see a message without need to add a control code for a line feed process and a dummy space for a line to a character string that composes a message.

To accomplish the above-described object, the present invention is a radio communication apparatus, comprising a receiving means for receiving a radio signal transmitted from a base station, the radio signal including character codes, a display portion for displaying characters corresponding to character codes received by the receiving means on a plurality of lines, a detecting means for detecting a particular character from the character codes received by the receiving means, and a display controlling means for displaying word just before the particular character on one line of the display portion and a word just after the particular character on the next line of the display portion.

The particular character is a character that represents a delimiter of two character strings that compose respective words.

When said detecting means has detected the particular character, the display controlling means displays the character just after the particular character at the beginning of the next line.

According to the present invention, since each word of a message composed of a received character string is prevented from being displayed on a plurality of lines, the user can easily see a character string on the screen of the display portion. In addition, since it is not necessary to add a dummy space and a control code for a line feed process to transmission data, a character string can be transmitted with a short data length in a format that the user can easily see data.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 4 is a schematic diagram showing an example of a received character string of the radio telephone unit shown in FIG. 2;

FIG. 9 is a schematic diagram showing an another example of a received character string;

FIG. 10 is a schematic diagram showing a displayed example of the character string shown in FIG. 9; and FIG. 11 is a schematic diagram showing a problem in the case that a received character string is displayed.

DESCRIPTION OF PREFERRED EMBODIMENTS

Next, with reference to the accompanying drawings, an embodiment of the present invention will be described.

Figure 1:
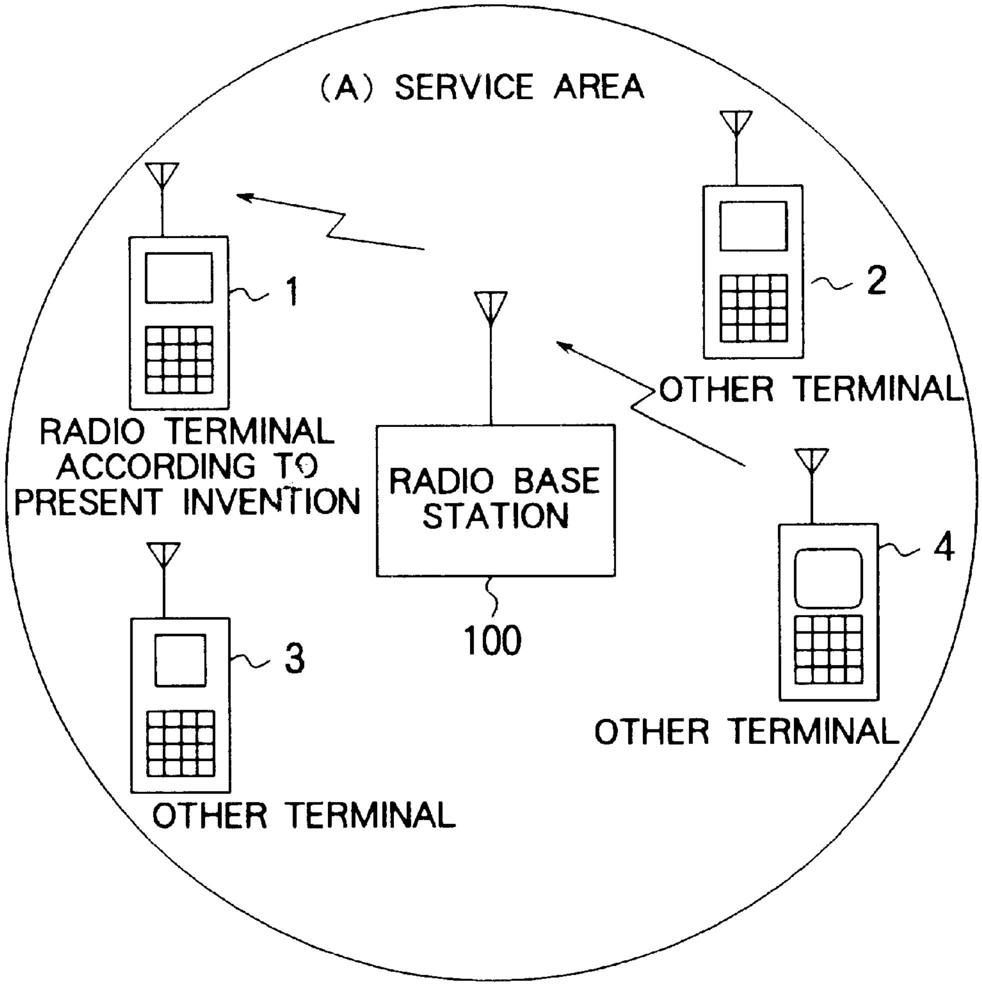
FIG. 1 is a schematic diagram showing the structure of a digital radio communication system having radio telephone units as mobile stations.

FIG. 1 is a schematic diagram showing the structure of a digital radio communication system having radio telephone units according to the present invention as mobile stations.

As shown in FIG. 1, a radio telephone unit 1 communicates audio data, character code data, and various types of data with other radio telephone units through a radio base station 100. The present invention is not limited to a specific digital radio communication system. In other words, the present invention can be applied to any system as long as a message to be displayed is transmitted/received as a character string code. The models of the other radio telephone units 2, 3, and 4 are not specified. In other words, the radio telephone units 2, 3, and 4 may be the same as or different from the radio telephone unit 1 according to the present invention.

Figure 2:
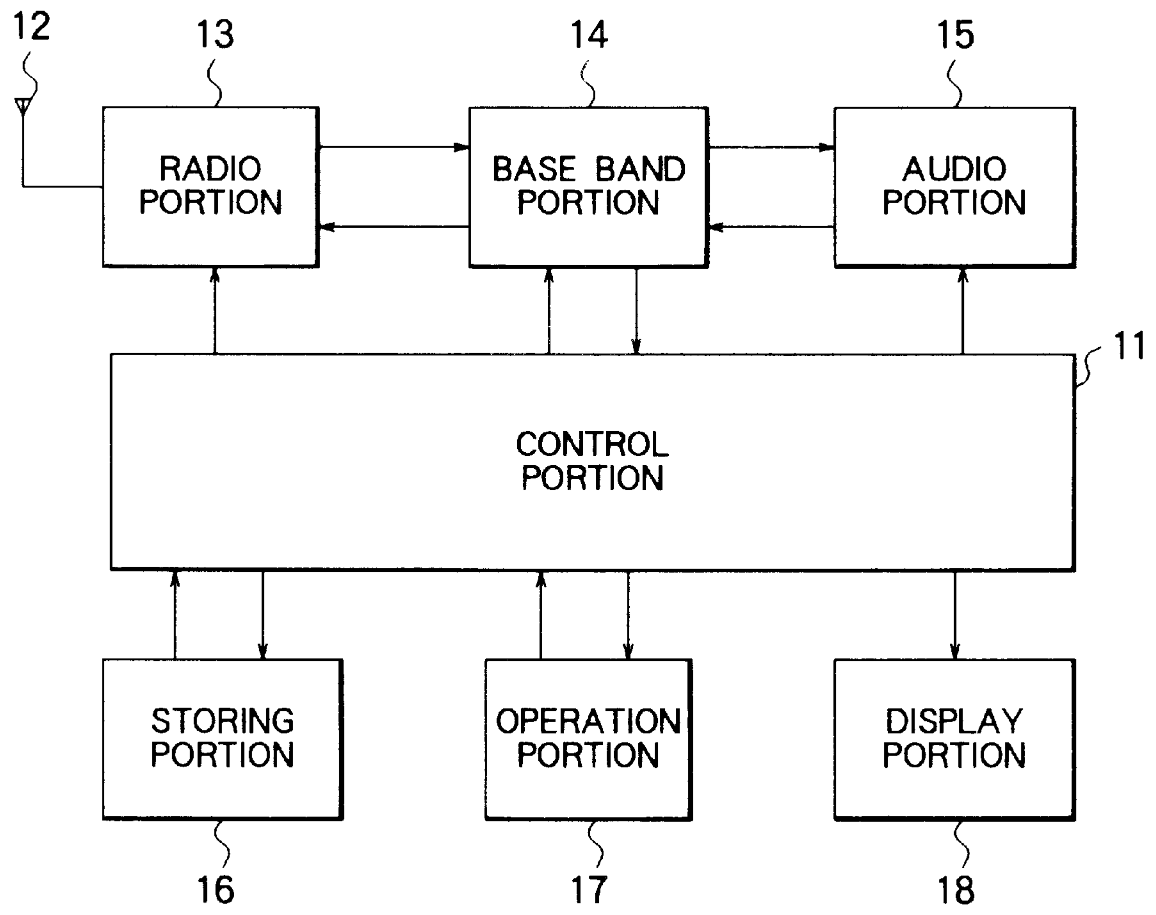
FIG. 2 is a schematic diagram showing the structure of a radio telephone unit.

As shown in FIG. 2, the radio telephone unit 1 according to the present invention comprises a control portion 11, an antenna 12, a radio portion 13, a base band portion 14, an audio portion 15, a storing portion 16, an operation portion 17, and a display portion 18. The radio portion 13 modulates a signal to be transmitted and demodulates a received signal. The base band portion 14 combines an audio signal to be transmitted with a control signal and separates an audio signal and a control signal from a received signal. The audio portion 15 inputs/outputs a sound. The storing portion 16 stores a character code extracted from a control signal that is separated from a received signal by the control portion 11. The operation portion 17 inputs commands for various processes to the control portion 11. The display portion 18 is for example a liquid crystal display. The display portion 18 displays character data that is read from the storing portion 16 corresponding to a character string code display command that is input from the operation portion 17 under the control of the control portion 11. The control portion 11 controls all the processes of the unit corresponding to a program stored therein. In addition, the control portion 11 executes a command received from the operation portion 17.

Next, the operation of the radio telephone unit according to the present invention will be described.

With the antenna 12, the radio telephone unit 1 receives a radio signal including a character string code from the radio base station 100. The radio portion 13 demodulates the received radio signal. The base band portion 14 separates the radio signal into a control signal and an audio signal. The control portion 11 analyzes the obtained control signal. The control portion 11 extracts a character string code from the control signal corresponding to the analyzed result. The extracted character string code is stored in the storing portion 16. The control portion 11 informs the user that the unit has received a character string code through the display portion 18. Thus, the user can see the character string on the screen of the display portion 18.

When the user inputs a display command for the character string code to the unit with the operation portion 17, the control portion 11 reads the character string code from the storing portion 16, converts the character codes into relevant character data, and outputs the data to the display portion 18. Thus, the characters are displayed on the screen of the display portion 18.

In the character display process, the control portion 11 extracts particular codes from the character codes. In this case, it is assumed that a message composed of character codes is described in English. In this case, space codes placed between words are character codes to be retrieved. When the control portion 11 detects a space code in character codes that are read from the storing portion 16, the control portion 11 places the character just after the space at the beginning of the next line (namely, performs a line feed process).

Figure 3:
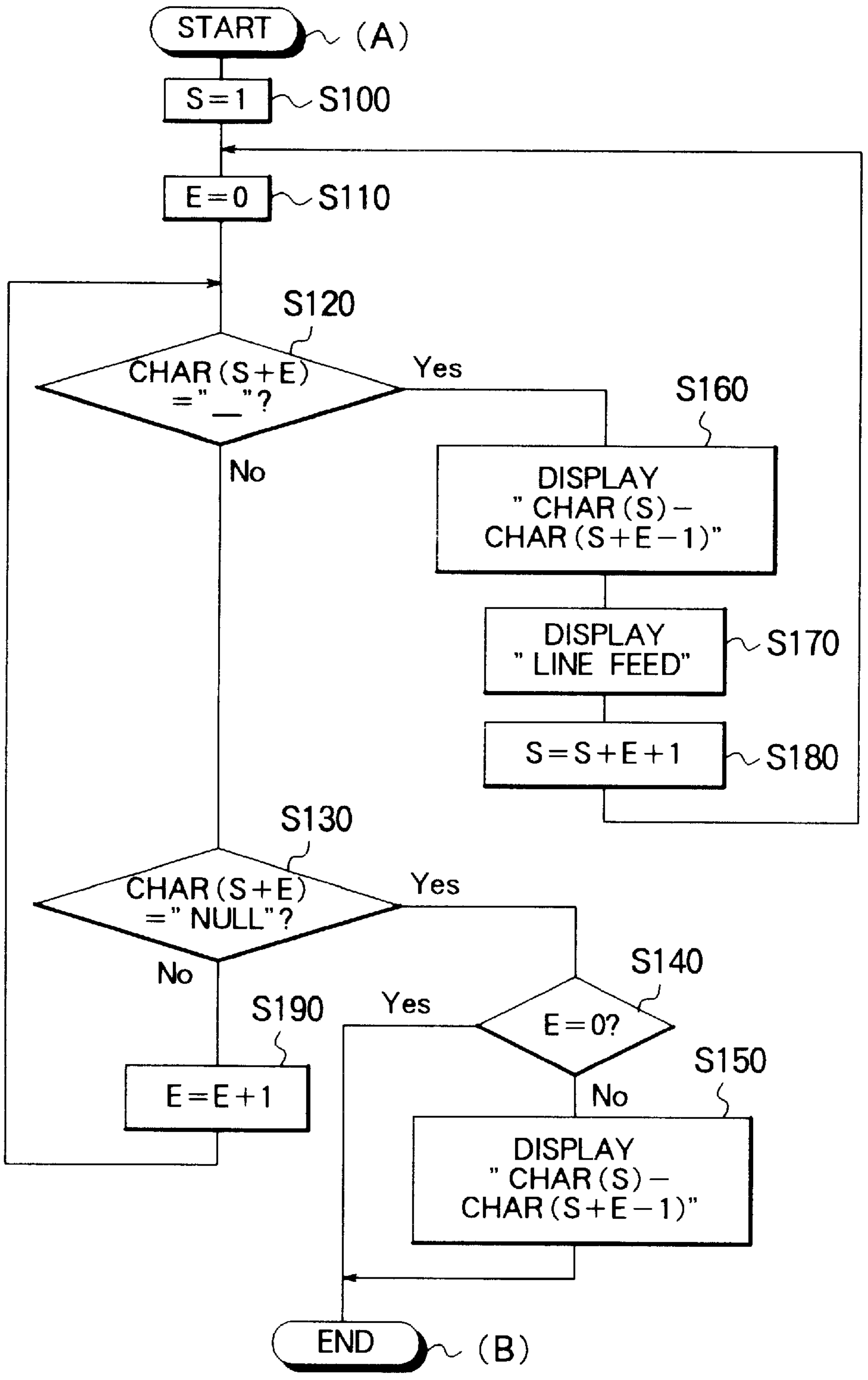
FIG. 3 is a flow chart showing a display process of a character string of the radio telephone unit.

Next, with reference to a flow chart shown in FIG. 3, the line feed process will be described.

In the initial state, "nulls" have been stored in a blank area of the storing portion 16.

Before the line feed process is performed, two counters are initialized in such a manner that the value (S) of the first counter becomes "1" and the value (E) of the second counter becomes "0" (at steps S100 and S11).

After the first and second counters have been initialized, it is determined by the control portion 11 (at step S120) whether or not an (S+E)-th character of a character code string stored in the storing portion 16 is "_" (space). When the character is not a "_" (space), it is determined whether or not the character is "null" (at step S130). When the character is a "null", it is determined whether or not the value (E) of the second counter is "0" (at step S140). When the value (E) of the second counter is "0", the process is completed. When the value (E) of the second counter is larger than "0", the S-th to (S+E−1)-th characters (or a character string thereof) are displayed on the display portion 18 (at step S150). Thereafter, the process is completed.

When the (S+E)-th character at step S120 is a "_" (space), the S-th to (S+E−1)-th characters (or a character string thereof) are displayed on the display portion 18 (at step S160). Thereafter, the character display line is advanced by "1" (at step S170). The value (S) of the first counter is incremented (S=S+E+1) (at step S180). Next, the flow returns to step S110. After step S110, the next character is determined.

When the character determined at step S120 and S130 is neither a "_" (space) nor a "null", the value (E) of the second counter is incremented (E=E+1) (at step S190). Thereafter, the flow returns to step S120. At step S120, the next character is determined.

Next, the above-described operation will be described in the case that a character string as shown in FIG. 4 has been received.

At step S100, the value (S) of the first counter is set to "1". At step S110, the value (E) of the second counter is set to "0". At steps S120 and S110, the first character (S+E=1+0) is determined. Since the first character is "C" (neither a "_" (space) nor a "null"), the value (E) of the second counter is incremented by "1" at step S190. Thus, the value (E) of the second counter becomes "1".

Next, the second character (S+E=1+1) is determined. Since the second character is "A" (neither a "_" (space) nor a "null"), the value (E) of the second counter is incremented by "1" at step S190. Thus, the value (E) of the second counter becomes "2" (E=2).

When the fifth character (S+E=1+4) is determined, a "_" (space) is detected. Thus, the flow advances to step S160. At step S160, a character string "CALL" from the first character (S) to the fourth character (S+E−1) is displayed on the display portion 18. At step S170, the line feed process is performed. At step S180, the value (S) of the second counter is incremented by "1" (S=S+E+1). Thus, the value (S) of the second counter becomes "6" (S=1+4+1=6). Thereafter, the flow advances to step S110. At step S110, the value (E) of the second counter is set to "0".

Since the sixth character (S+E=6+0) is "0" (nether a "_" (space) nor a "null"), the value (E) of the second counter is incremented by "1" at step S190. Thus, the value (E) of the second counter becomes "1" (E=1). Thereafter, the flow returns to step S120.

When the twelfth character (S+E=6+6) is determined, a "_" (blank) is detected. Thus, the flow advances to step S160. Consequently, a character string "OFFICE" from the sixth to eleventh characters (S+E−1) is displayed on the display portion 18. At step S170, the line feed process is performed. At step S180, the value (S) of the second counter is incremented by "1" (S=S+E+1). Thus, the value (S) of the second counter becomes "13" (S=6+6+1=13).

When the thirteenth (S+E=13+0) to nineteenth (S+E=16+6) characters are determined, a character string "TOSHIBA" (nether a "_" (blank) nor a "null") is detected. When the twentieth character (S+E=13+7) is determined, since a "null" is detected, the flow advances to step S140. At step S140, it is determined whether or not the value (E) of the second counter is "0". Since the value (E) of the second counter is "7", the flow advances to step S150. At step S150, the character string "TOSHIBA" of the thirteenth (S+E=13+0) to nineteenth (S+E=13+6) characters is displayed on the display portion 18. Thereafter, the process is completed.

Figure 5:
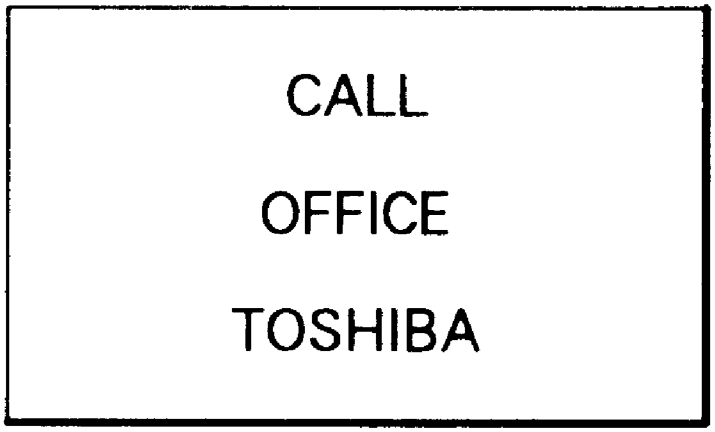
FIG. 5 is a schematic diagram showing a displayed example of the character string shown in FIG. 4.

FIG. 5 shows a character string displayed on the display portion 18. The size of the display portion 18 is 3 lines x 10 columns.

In the above example, a character string described in English is communicated. It should be noted that the present invention can be applied to languages other than English as long as a "_" (space) is placed between each word. In addition, a character for triggering a line feed process is not limited to a "_" (space). For example, a "," (comma), a ":" (colon) may be determined. In addition, a punctuation mark in Japanese may be determined. A line feed process may be performed after the punctuation mark. In a communication system, a character used for triggering a line feed process can be freely designated.

Next, a radio telephone unit according to a second embodiment of the present invention will be described.

According to the present invention, a plurality of character strings surrounded by "_" (space) may be displayed on one display line.

Figure 6:
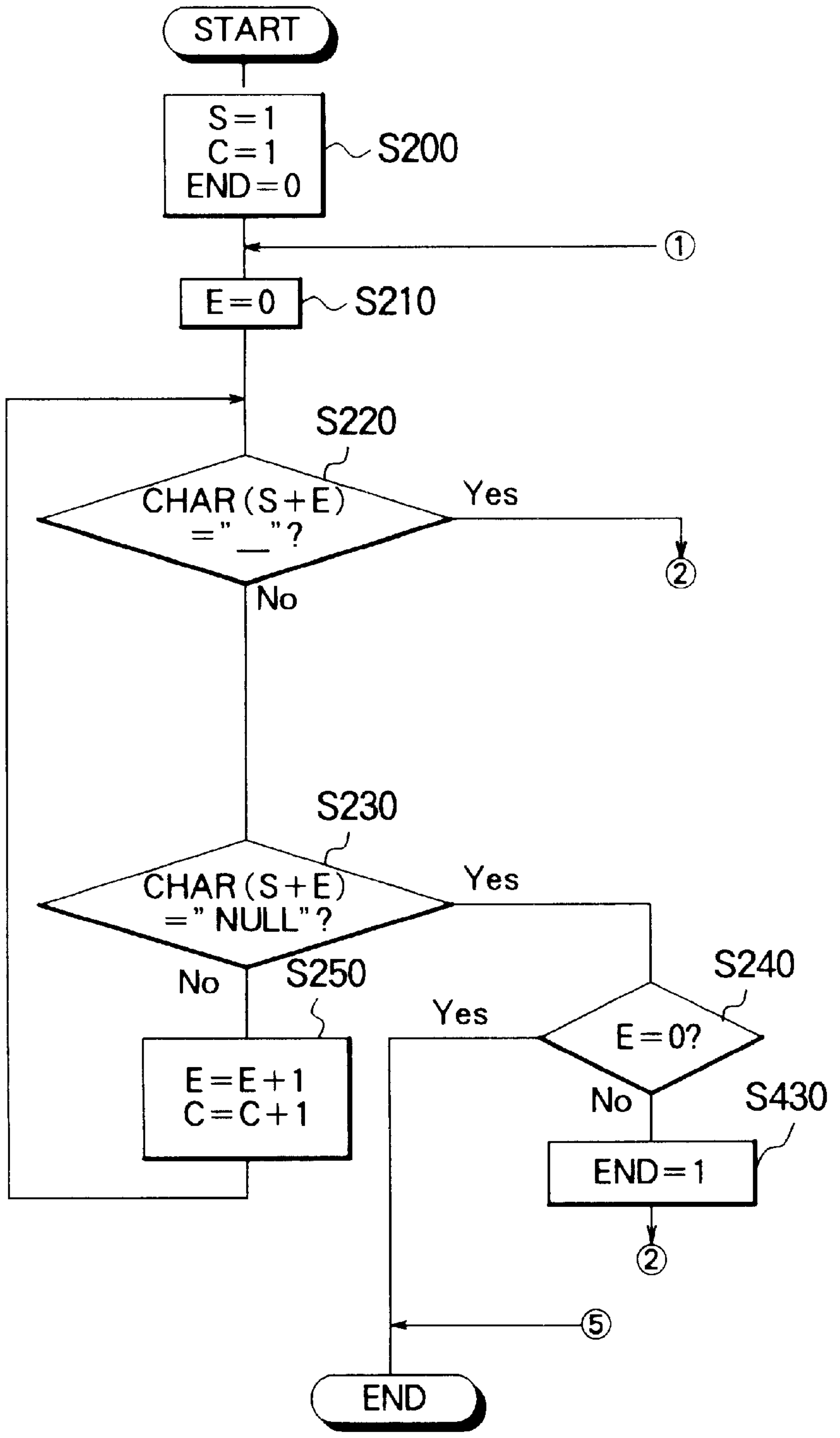
FIG. 6, FIG. 7, and FIG. 8 are flow charts showing a display process of a character string of another radio telephone unit.
Figure 7:
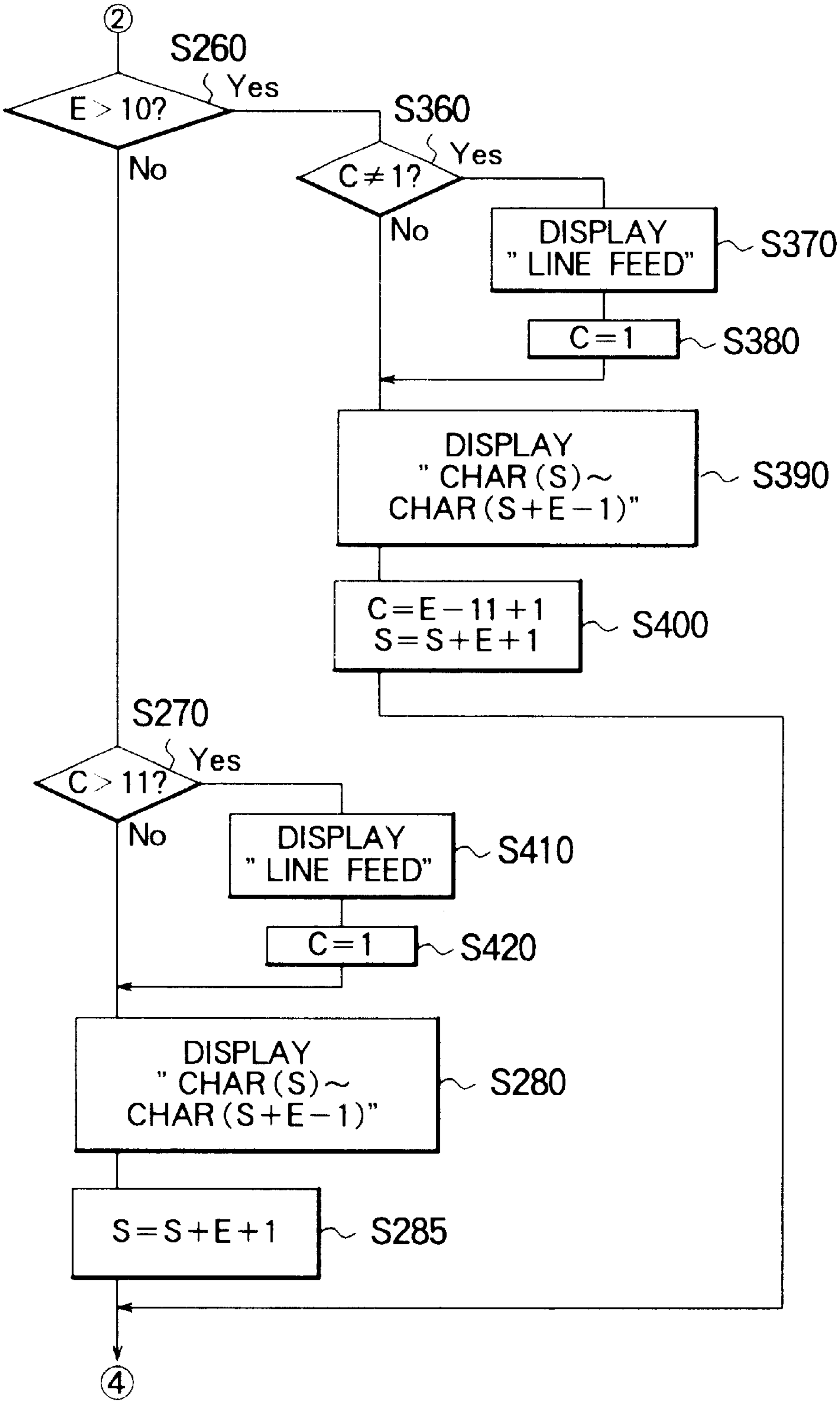
Figure 8:
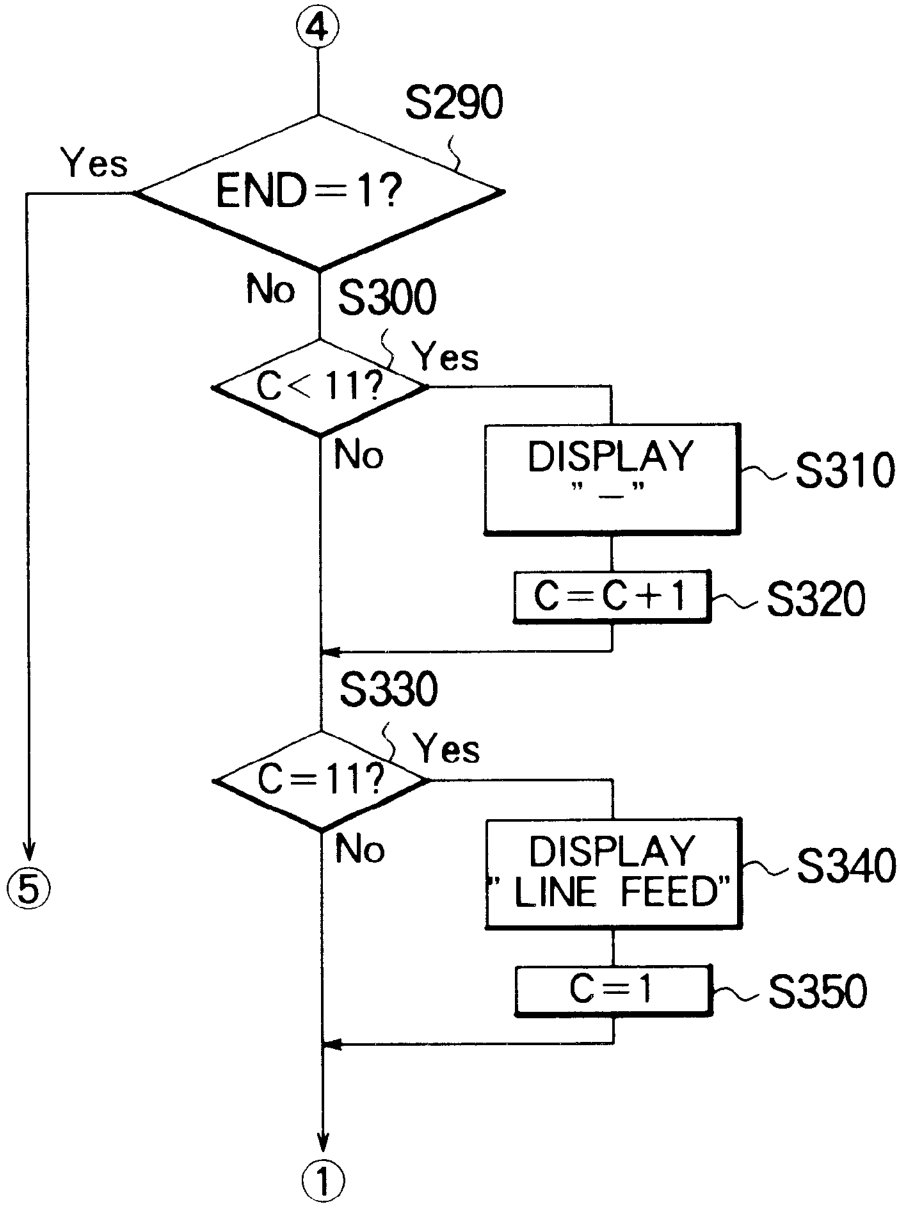

Next, with reference to flow charts shown in FIGS. 6 to 8, this process will be described. In this case, it is assumed that a particular character that has been registered is a "_" (space) and "null" has been registered to a blank record area. In addition, it is assumed that the number of display digits is 10.

As initial settings, a counter (S) that represents the start address of a character string is set to "1". A counter (C) that represents the number of display characters is set to "1". A character end flag (END) is set to "0" (at step S200). A counter (E) that represents the end address of the character string is set to "0" (at step S210).

Thereafter, it is determined whether or not the (S+E)-th character of the character string is a "_" (space) (at step S220). When the determined result at step S220 is No (namely, the (S+E)-th character is not a "_" (space), it is determined whether or not the (S+E)-th character is "null" (at step S230). When the determined result at step S230 is Yes (namely, the (S+E)-th character is "null"), it is determined whether or not the value of the counter (E) is "0" (at step S240). When the determined result at step S240 is Yes (namely, the value of the counter (E) is "0"), the process is completed. When the determined result at step S230 is No (namely, the (S+E)-th character is not "null"), the counter (E) and the counter (C) are incremented by "1", respectively (namely, E=E+1 and C=C+1) (at step S250). Thereafter, the flow returns to step S220. At step S210, the next character is determined.

When the determined result at step S220 is Yes (namely, the (S+E)-th character is a "_" (space), it is determined whether or not the value of the counter (E) is larger than "10" (at step S260).

When the determined result at step S260 is No, it is determined whether or not the value of the counter (C) is larger than "11" (at step S270). When the determined result at step S270 is No, the S-th to (S+E−1)-th characters of the character string are displayed (at step S280). Thereafter, the flow advances to step S285. At step S285, the counter (S) is set to S=S+E+1.

Next, it is determined whether or not the flag (END) is "1" (at step S290). When the determined result at step S290 is Yes (namely, END=1), the process is completed. When the determined result at step S290 is No, it is determined whether or not the value of the counter (C) is smaller than "11" (at step S300). When the determined result at step S300 is Yes (namely, C<11), a "_" (space) is displayed (at step S310). Next, the counter (C) is incremented by "1" (namely, C=C+1) (at step S320). When the determined result at step S300 is No (namely, the value of the counter C is not smaller than "11"), it is determined whether or not the value of the counter (C) is "11" (at step S330). When the determined result at step S330 is Yes (namely, C=11), a line feed is executed (at step S340). Thereafter, the counter (C) is set to "1" (at step S350). When the determined result at step S330 is No, the flow returns to step S210. At step S210, the next character is determined.

When the determined result at step S260 is Yes (namely, E>10), it is determined whether or not the value of the counter (C) is not "1" (at step S360). When the determined result at step S360 is Yes, a line feed is executed (at step S370). Thereafter, the counter (C) is set to "1" (at step S380). Next, the flow advances to step S390. When the determined result at step S360 is No (namely, C=1), the S-th to (S+E+1)-th characters are displayed (at step S390). Thereafter, the counters (C) and (S) are set to C=E−11+1 and S=S+E+1, respectively (at step S400). Thereafter, the flow advances to step S290.

When the determined result at step S270 is Yes (namely, C>11), a line feed is executed (at step S410). Thereafter, the counter (C) is set to "1" (at step S420).

Thereafter, the S-th to (S+E−1)-th characters of the character string are displayed (at step S280). Next, the counters (S) is set to S=S+E+1, (at step S285). Thereafter, the flow advances to step S290.

When the determined result at step S240 is NO (namely, E≠0), the flag (END) is set to "1" (at step S430). Thereafter, the flow advances to step S260.

FIG. 9 shows an example of a character string received from a base station. When the character string is displayed corresponding to the flow chart shown in FIGS. 6 to 8, at step S200, the counter (S) is set to "1". The counter (C) is set to "1". The flag (END) is set to "0". At step S210, the counter (E) is set to "0". At steps 220 and S230, the first ((S+E=1+0)-th) character is determined. Since the first character is "T", neither a (space) "_" (space) nor "null", the counters (E) and (C) are incremented by "1" each (at step S250). Thereafter, the flow returns to step S220.

At steps S220 and S230, the second ((S+E=1+1)-th) character is determined. Since the second character is "H", the counters (E) and (C) are incremented by "1" each (at step S250). Thereafter, the flow returns to step S220.

These steps are repeated until the value of the counter (E) becomes "4". Thereafter, the flow returns to step S220. At step S220, the fifth ((S+E=1+4)-th) character is determined. Since the fifth character is a "_" (space), the flow advances to step S260. At steps S260 and S270, the values of the counters (E) and (C) are determined. Since the conditions are not satisfied, the flow advances to step S280. At step S280, the first (S-th) to fourth ((S+E+1)-th) characters (namely, "THIS") are displayed. At step S285, the counter (S) is set to S=S+E+1. Thereafter, the flow advances to step S290. Since the value of the flag (END) is not "1", the flow advances to step S300. Since the value of the counter (C) is "4", a "_" (space) is displayed at step S310. Thereafter, the counter (C) is incremented by "1" (namely, C=C+1) at step S320.

Next, the flow advances to step S330. At step S330, since the condition is not satisfied, the flow returns to step S210.

At step S220, it is determined whether or not the (S+E)-th character is a "_" (space) until the value of the counter (E) becomes "2". Thereafter, the flow returns to step S220. At step S220, the eighth ((S+E=6+2)-th) character is determined. Since the eighth character is a "_" (space), the flow advances to step S260. At step S280, the sixth (S-th) to seventh ((S+E−1)-th) characters (namely, "IS") are displayed. At step S285, the counter (S) is set to S=S+E+1. Thereafter, the flow advances to step S290. Since the value of the flag (END) is not "1", the flow advances to step S300. Since the value of the counter (C) is "8", the flow advances to step S310. At step S310, a "_" (space) is displayed. Next, the counter (C) is incremented by "1" at step S320.

Thereafter, the flow advances to step S330. Since the condition is not satisfied, the flow returns to step S210.

At step S220, it is determined whether or not the (S+E)-th character is a "_" (space) until the value of the counter (E) becomes "1". Thereafter, the flow returns to step S220. At step S220, the tenth ((S+E=9+1)-th) character is determined. Since the tenth character is a "_" (space), the flow advances to step S260. At step 280, the ninth character (the S-th to (S+E−1)-th characters) (namely, "A") is displayed. At step S285, the counter (S) is set to S=S+E+1. Thereafter, the flow advances to step S290. Since the value of the flag (END) is not "1", the flow advances to step S300. Since the value of the counter (C) is "10", a "_" (space) is displayed at step S310. The counter (C) is incremented by "1" at step S320. Next, at step S330, since the value of the counter (C) is "11", the flow advances to step S340. At step S340, a line feed is executed. At step S350, the counter (C) is set to "1". Thereafter, the flow returns to step S210.

Next, at step S230, it is determined whether or not the (S+E)-th character is "null" until the value of the counter (E) becomes "3". Thereafter, the flow returns to step S230. At step S230, the fourteenth ((S+E=11+3)-th) character is determined. Since the fourteenth character is "null", the flow advances to step S240. At step S240, since the value of the counter (E) is not "0", the flow advances to step S430. At step S430, the flag (END) is set to "1". Thereafter, the flow advances to step S260. Since the conditions are not satisfied at steps S260 and S270, the flow advances to step S280. At step S280, the eleventh (S-th) to thirteenth (S+E+1)-th characters (namely, "PEN") are displayed.

In the above-described process, a plurality of character strings surrounded by "_" (space) can be displayed on one display line.

FIG. 10 shows the character strings on the display line corresponding to the embodiment.

As described above, in the radio telephone unit according to the second embodiment, a word of a message composed of a received character string is prevented from being displayed on a plurality of lines. Thus, the user can easily see the character string. In addition, since it is not necessary to add a dummy space and a control code for a line feed process to transmission data, a character string with a shorter data length can be transmitted in a format so that the user can easily see data.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A radio communication apparatus, comprising:

receiving means for receiving a radio signal transmitted from a base station, the radio signal including character codes representing characters, the characters including a particular character that separates the remaining characters into words, a display portion for displaying characters on a plurality of lines, detecting means for detecting the particular character, and display controlling means for displaying a word just before the particular character on one line of the display portion and a word just after the particular character on the next line of the display portion.

2. The radio communication apparatus as set forth in claim 1, wherein the particular character represents a delimiter of the words.

3. The radio communication apparatus as set forth in claim 1, wherein the particular character is a space placed between words.

4. A radio communication apparatus, comprising:

receiving means for receiving a radio signal transmitted from a base station, the radio signal including character codes representing characters, the characters including particular characters that separate the remaining characters into words, a display portion for displaying characters on a plurality of lines, detecting means for detecting the particular characters, determining means for determining whether each word can be displayed completely on a particular line of the display portion, and display controlling means for displaying the word on a next line of the display portion when the determining means determines that the word cannot be displayed completely on the particular line.

5. The radio communication apparatus as set forth in claim 4, wherein the particular characters represent delimiters of the words.

6. The radio communication apparatus as set forth in claim 4, wherein one of the particular characters is a space placed between words.

7. A radio communication apparatus, comprising:

receiving means for receiving characters that include a plurality of words and a particular character separating the words, wherein the characters are transmitted from a base station;

display means having a plurality of display lines for sequentially displaying the characters received by the receiving means;

means for recognizing the length of each word by studying the characters to detect a particular character; and means for controlling the display means to display each word on a display line if the length of the word does not exceed a space available on the display line and otherwise to display the word on a next display line.

* * * * *